(12) United States Patent
Xu et al.

(10) Patent No.: US 11,875,495 B2
(45) Date of Patent: Jan. 16, 2024

(54) METHODS OF VIDEO QUALITY ASSESSMENT USING PARAMETRIC AND PIXEL LEVEL MODELS

(71) Applicant: TENCENT AMERICA LLC, Palo Alto, CA (US)

(72) Inventors: Xiaozhong Xu, State College, PA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 169 days.

(21) Appl. No.: 17/362,145

(22) Filed: Jun. 29, 2021

(65) Prior Publication Data

US 2022/0044385 A1 Feb. 10, 2022

Related U.S. Application Data

(60) Provisional application No. 63/063,712, filed on Aug. 10, 2020.

(51) Int. Cl.
*G06T 7/00* (2017.01)
*G06T 7/20* (2017.01)

(52) U.S. Cl.
CPC .............. *G06T 7/0002* (2013.01); *G06T 7/20* (2013.01); *G06T 2207/10016* (2013.01); *G06T 2207/30168* (2013.01)

(58) Field of Classification Search
CPC ............. G06T 7/0002; G06T 7/20; G06T 2207/10016; G06T 2207/30168;
(Continued)

(56) References Cited

U.S. PATENT DOCUMENTS 8,656,144 B2 * 2/2014 Kang ................. H04N 5/77
712/216
2012/0057640 A1 * 3/2012 Shi .................... H04N 19/198
375/240.26
(Continued)

FOREIGN PATENT DOCUMENTS

CN 110719457 A 1/2020
JP 2009-44393 A 2/2009
WO 2008/081185 A2 7/2008

OTHER PUBLICATIONS

International Search Report dated Oct. 20, 2021 in International Application No. PCT/US21/41249.
(Continued)

*Primary Examiner* — Edward F Urban
*Assistant Examiner* — Benedict E Lee
(74) *Attorney, Agent, or Firm* — Sughrue Mion, PLLC

(57) ABSTRACT

A method, apparatus and storage medium for performing a video quality assessment (VQA) are provided. The method includes obtaining a plurality of images of a video, the plurality of images being divided into one or more groups; determining first images among the plurality of images to which a parametric-based VQA is to be applied, the first images being all of the plurality of images; determining a first score based on applying the parametric-based VQA to each of the first images; determining second images among the plurality of images to which a sample-based VQA is to be applied; determining a second score based on applying the sample-based VQA to each of the second images; and outputting a final score for at least one image based on the first score and the second score.

15 Claims, 10 Drawing Sheets

(58) Field of Classification Search
CPC ...... H04N 19/43; H04N 19/51; H04N 19/146; H04N 19/147; H04N 19/14; H04N 19/154; H04N 19/70
See application file for complete search history.

(56) References Cited

U.S. PATENT DOCUMENTS

| | | | |
|---|---|---|---|
| 2012/0307915 A1 | 12/2012 | Clark | |
| 2014/0376618 A1* | 12/2014 | Ma | H04N 19/46 375/240.03 |
| 2017/0201752 A1* | 7/2017 | Wang | H04N 19/426 |
| 2020/0195934 A1 | 6/2020 | Xing et al. | |
| 2021/0385502 A1* | 12/2021 | Dinh | H04N 19/46 |
| 2022/0329787 A1* | 10/2022 | Wang | H04N 19/107 |

OTHER PUBLICATIONS

Written Opinion of the International Searching Authority dated Oct. 20, 2021 in International Application No. PCT/US21/41249.
"Parametric bitstream-based quality assessment of progressive download and adaptive audiovisual streaming services over reliable transport", International Telecommunication Union, ITU-T, Telecommunication Standardization Sector of ITU, Recommendation ITU-T P.1203, SERIES P. Telephone Transmission Quality, Telephone Installations, Local Line Networks, Models and tools for quality assessment of streamed media, Oct. 2017, 22 pages.
Extended European Search Report dated Nov. 3, 2022 in European Application No. 21856402.9.
Margaret H. Pinson et al., "A New Standardized Method for Objectively Measuring Video Quality", IEEE Transactions on Broadcasting, Sep. 2004, vol. 50, No. 3, pp. 312-322 (11 pages total).
Jose Joskowicz et al., "A parametric model for perceptual video quality estimation", Telecommun Syst, 2012, vol. 49, pp. 49-62 (14 pages total).
Office Action dated Aug. 15, 2023 in Japanese Application No. 2022-530885.

* cited by examiner

METHODS OF VIDEO QUALITY ASSESSMENT USING PARAMETRIC AND PIXEL LEVEL MODELS

CROSS-REFERENCE TO RELATED APPLICATION

This application is based on and claims priority to U.S. Provisional Application No. 63/063,712 filed on Aug. 10, 2020, in the United States Patent and Trademark Office, the disclosure of which is incorporated by reference herein in its entirety.

BACKGROUND

1. Field

The disclosure relates to the field of advanced multimedia technology, and in particular, to a device and a method of evaluating the quality of a video or an image with or without compression.

2. Description of Related Art

With the affordable and reliable consumer capture devices and the popularity of social media platforms, videos and images have become daily lives of many people. Due to a large size of visual data with the improvement of cameras, video compression is generally applied to raw visual data (e.g., an image or a video captured by a camera) to be transmitted at a faster rate from one device to another. However, a compression system typically introduces artifacts or degradation to the visual quality of the raw visual data. Therefore, it may be desirable to recognize the presence of certain compression artifacts or degradation in videos and images in order to fix and improve the quality of a video.

One approach for understanding and recognizing compression artifacts or degradation is by performing video quality assessment ("VQA"). To assess the quality of a video or an image, a person can perform visual examination on the video under certain environment and testing conditions (e.g., light condition, distance, etc.) and evaluate the video using, for example, mean opinion score ("MOS"). However, the downside of this manual operation is that it consumes time and incurs significant costs when the testing scale is extensive. To provide a fast and economic evaluation of visual data quality without the human eyes, objective methods are used to replace such a manual operation. In general, the objective methods in VQA classified into three categories: (1) no reference VQA that provides no reference data, (2) a full reference VQA that provides ground truth data, and (3) a partial (reduced) reference VQA that provides a partial, but not all reference data.

In the no reference VQA, evaluation methods are purely based on decoded images without any knowledge of an original image. Some of the features taken into account when evaluating the decoded images may include a sharpness, gradients, etc. A score may be produced by mapping the behaviors of one or more features into a numerical value, for example, between 0 to 100.

In the full reference VQA, evaluation methods are based on the difference between test data and reference data. The larger the difference between the test data and the reference data, the larger the degradation of compression. One example metric may be Video Multimethod Assessment Fusion ("VMAF") in which subject video quality is predicted based on a reference and distorted video sequence. This metric can be used to evaluate the quality of different video encoders.

In the partial reference VQA, only partial information of the reference data is made available for evaluating the video quality. One example may be using coding parameters of a bitstream (e.g., a quantization parameter (QP), a group of pictures (GOP) size, a frame rate, a resolution, a bitrate, etc.) to estimate the quality of the video. Another example may be using a subset of a reference video, such as a down-sample version of an original video and/or image.

The video quality assessment methods with low computational complexity and low system delay are generally preferred for subjective evaluation of videos and images. However, when more intensive computations need to be performed, the accuracy of the subjective evaluation may be reduced. Also, some applications may not be able to support the intensive computations on pixel-by-pixel basis to evaluate the quality of a video even when the no reference VQA is applied. Therefore, there is a need for a technical solution to achieve light-weight quality evaluation while maintaining the reliability of the evaluation.

SUMMARY

According to an embodiment, there is provided a method of performing a video quality assessment (VQA). The method includes: obtaining a plurality of images of a video, the plurality of images being divided into one or more groups; determining first images among the plurality of images to which a parametric-based VQA is to be applied, the first images being all of the plurality of images; determining a first score based on applying the parametric-based VQA to each of the first images; determining second images among the plurality of images to which a sample-based VQA is to be applied; determining a second score based on applying the sample-based VQA to each of the second images; and outputting a final score for at least one image based on the first score and the second score.

According to an embodiment, there is provided an apparatus for performing a video quality assessment (VQA). The apparatus includes: at least one memory storing compute program code; and at least one processor configured to access the at least one memory and operate as instructed by the computer program code. The computer program code includes: obtaining code configured to cause the at least one processor to obtain a plurality of images of a video, the plurality of images being divided into one or more groups; first determining code configured to cause the at least one processor to determine first images among the plurality of images to which a parametric-based VQA is to be applied, the first images being all of the plurality of images, and determine a first score based on applying the parametric-based VQA to each of the first images; second determining code configured to cause the at least one processor to determine second images among the plurality of images to which a sample-based VQA is to be applied, and determine a second score based on applying the sample-based VQA to each of the second images; and output code configured to cause the at least one processor to output a final score for at least one image based on the first score and the second score.

According to an embodiment, there is provided a non-transitory computer-readable storage medium storing computer program code, the computer program code, when executed by at least one processor, the at least one processor is configured to: obtain a plurality of images of a video, the plurality of images being divided into one or more groups;

determine first images among the plurality of images to which a parametric-based VQA is to be applied, the first images being all of the plurality of images, and determine a first score based on applying the parametric-based VQA to each of the first images; determine second images among the plurality of images to which a sample-based VQA is to be applied, and determine a second score based on applying the sample-based VQA to each of the second images; and output a final score for at least one image based on the first score and the second score.

BRIEF DESCRIPTION OF THE DRAWINGS

The following description briefly introduces the accompanying drawings, which illustrate the one or more embodiments of the disclosure.

DETAILED DESCRIPTION

Example embodiments are described in detail herein with reference to the accompanying drawings. It should be understood that the one or more embodiments of the disclosure described herein are only examples, and should not be construed as limiting the scope of the disclosure.

Figure 1:
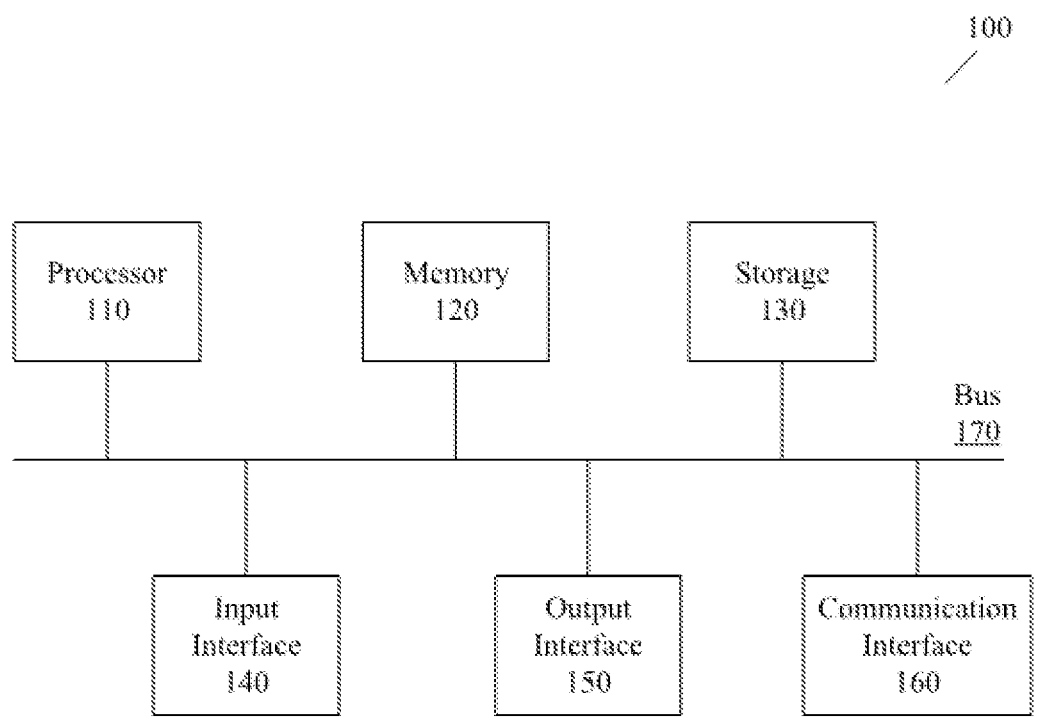
FIG. 1 is a diagram illustrating a video quality assessment device according to an embodiment.

FIG. 1 is a diagram illustrating a video quality assessment device according to an embodiment.

Referring to FIG. 1, a video quality assessment (VQS) device 100 may include a processor 110, a memory 120, a storage 130, an input interface 140, an output interface 150, a communication interface 160 and a bus 170. The VQS device 100 may be implemented as a part of an encoder and/or a decoder to assess the quality of a video or an image. However, the one or more embodiments are not limited thereto, and the VQS device 100 may be connected to the encoder and/or the decoder, but may be physically separated from the encoder and/or the decoder. Also, the VQS device 100 may be an algorithm in the form of software stored in the memory 120 and executed by the processor 110 connected to the memory 120.

The processor 110 may be implemented in hardware, firmware, or a combination of hardware and software. The processor 110 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 110 may include one or more processors capable of being programmed to perform a function.

The memory 120 may include a random access memory (RAM), a read only memory (ROM), and/or another type of dynamic or static storage device (e.g., a flash memory, a magnetic memory, and/or an optical memory) that stores information and/or instructions for use by the processor 110.

The storage 130 stores information and/or software related to the operation and use of the VQS device 100. For example, the storage 130 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input interface 140 may include a component that permits the VQS device 100 to receive information, such as via user input (e.g., a touch screen display, a keyboard, a keypad, a mouse, a button, a switch, and/or a microphone). Additionally, or alternatively, the input interface 140 may include a sensor for sensing information (e.g., a global positioning system (GPS) component, an accelerometer, a gyroscope, and/or an actuator).

The output interface 150 may include a component that provides output information from the VQS device 100 (e.g., a display, a speaker, and/or one or more light-emitting diodes (LEDs)).

The communication interface 160 includes a transceiver-like component (e.g., a transceiver and/or a separate receiver and transmitter) that enables the VQS device 100 to communicate with other devices, such as via a wired connection, a wireless connection, or a combination of wired and wireless connections. The communication interface 160 may permit the VQS device 100 to receive information from another device and/or provide information to another device. For example, the communication interface 160 may include an Ethernet interface, an optical interface, a coaxial interface, an infrared interface, a radio frequency (RF) interface, a universal serial bus (USB) interface, a Wi-Fi interface, a cellular network interface, or the like.

The bus 170 includes a component that permits communication among the components of the VQS device 100.

The VQS device 100 may perform one or more operations described herein. The VQS device 100 may perform operations described above in response to the processor 110 executing software instructions stored in a non-transitory computer-readable medium, such as the memory 120 and/or the storage 130. A computer-readable medium is defined herein as a non-transitory memory device. A memory device includes memory space within a single physical storage device or memory space spread across multiple physical storage devices.

Software instructions may be read into the memory 120 and/or the storage 130 from another computer-readable medium or from another device via the communication interface 160. When executed, software instructions stored in the memory 120 and/or the storage 130 may cause the processor 110 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 1 are provided as an example. In practice, the VQS device 100 may include additional components, fewer components, different components, or differently arranged components than those shown in FIG. 1. Additionally, or alternatively, a set of components (e.g., one or more components) of the VQS device 100 may perform one or more functions described as being performed by another set of components of the VQS device 100.

Figure 2:
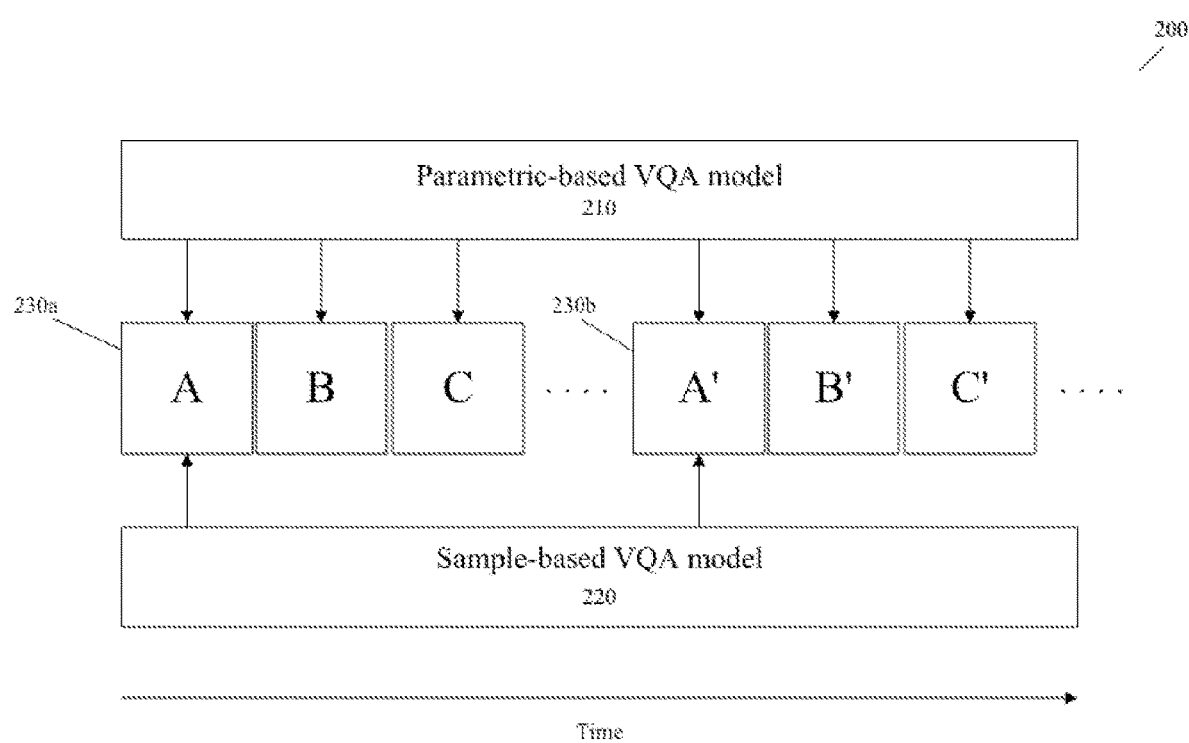
FIG. 2 is a diagram illustrating a method of performing a video quality assessment according to an embodiment.

FIG. 2 is a diagram illustrating a method of performing a video quality assessment according to an embodiment.

Referring to FIG. 2, a VQA algorithm 200 may include a parametric-based VQA model 210 and a sample-based VQA model 220. A parametric-based VQA may refer to a video quality assessment that requires no pixel level information, but only bitstream level information. For example, the pixel level information may include information about color and location of each pixel in an image, and the bitstream level information may include information about bitrate, quantization parameter, frame solution, frame rate and etc. A sampled-based VQA may refer to a video quality assessment that requires pixel level analysis. In general, the sample-based VQA is more accurate than the parametric-based VQA, but the sample-based VQA requires more intensive calculations when there are many samples to be analyzed. In the conventional visual According to an embodiment, both of the parametric-based VQA model 210 and the sample-based VQA model 220 may be used for quality evaluation of one or more images. Specifically, the VQA algorithm 200 may be designed to apply the parametric-based VQA model more frequently than the sample-based VQA model. For example, a video to be evaluated may include images of a first group 230a and a second group 230b. The first group 230a may include images A, B and C, and the second group 230b may include images A', B' and C'. Although only two groups of images are shown in FIG. 2, there may be more than two groups of images.

In a specific example, the parametric-based VQA model 210 may be applied to each image frame in each group, and the sample-based VQA model 220 may be applied to a first image frame of each group. Specifically, as shown in FIG. 2, the parametric-based VQA model 210 is applied to each of the images A, B and C in the first group 230a and each of the images A', B' and C' in the second group 230b. In contrast, the sample-based VQA model 220 is applied to a first image A in the first group 230a and a first image A' in the second group 230b. As some applications may not be able to support the intensive computations on pixel-by-pixel basis for quality evaluation, the sample-based VQA model 220 may be selectively applied to some of the images among a plurality of images in the video. Accordingly, it reduces burden on the processing load when using both the parametric-based VQA model 210 and the sample-based VQA model 220 to evaluate the quality of a video. However, the one or more embodiments are not limited thereto. For example, the parametric-based VQA model 210 may be applied to each image among a plurality of images in a video, while the sample-based VQA model 220 is applied only on a subset of images, such as one in every second, one in every 30 frames, etc. In other words, the sample-based VQA 220 may be applied to images selected at a predetermined time interval or a predetermined frame interval.

According to an embodiment, the parametric-based VQA model 210 may be applied to each image frame of a video, and the sample-based VQA model 220 may be only applied to images with reduced resolution. For example, the sample-based VQA model 220 may be applied to 1:4 subsampled images.

According to an embodiment, the parametric-based VQA model 210 may be applied to each image frame of a video, and the sample-based VQA model 220 may be only applied to a set of regions within one or more images. For example, a target region of interest (ROI) may be identified for an image according to a user input, and the sample-based VQA model 220 may be only applied to the target ROI in the image. Although it has been described that the target ROI may be identified according to the user input, the one or more embodiments are not limited thereto. For example, the target ROI may be predetermined to be in the middle of a screen since the middle of the screen is where human eyes are generally directed or focused when viewing an image or a video. Also, the target ROI may be determined based on motion vectors. That is, when values of motion vectors of a region changes between consecutive image frames at a rate greater than a predetermined value, the region may be determined as the target ROI. Here, the motion vectors changing between consecutive frames at a rate greater than a predetermined value may mean that there is a lot of movement in the image frames.

Figure 3:
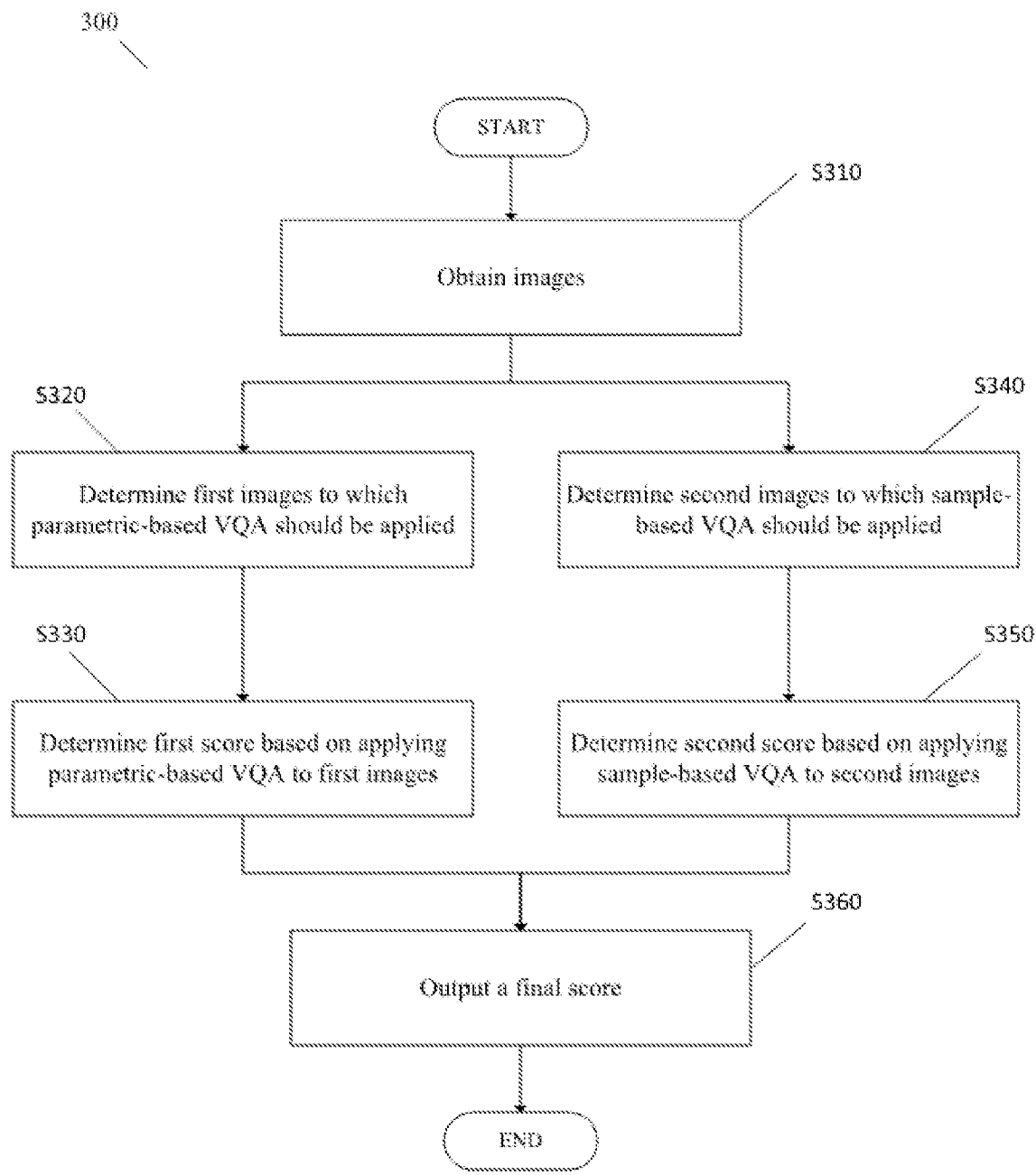
FIG. 3 is a flowchart illustrating operations of a video quality assessment according to an embodiment.

FIG. 3 is a flowchart illustrating operations of a video quality assessment according to an embodiment.

Referring to FIG. 3, a method 300 for performing a video quality assessment according to an embodiment is illustrated.

In S310, the method 300 may include obtaining images of a video to be analyzed. Here, the images of the video may be grouped into one or more groups as described above with reference to FIG. 2.

In S320, the method 300 may include determining first images to which the parametric-based VQA should be applied. According to an embodiment, the first images may be all of a plurality of images in a video. In other words, the parametric-based VQA may be applied to each of the plurality of images in the video. For example, referring back to FIG. 2, the first images may be images A, A', B, B', C and C'. However, the one or more embodiments are not limited thereto, and the parametric-based VQA may be selectively applied to some of the plurality of images of the video.

In S330, the method 300 may include determining a first score based on applying the parametric-based VQA to each of the first images. This operation will be described in more detail below with reference to FIG. 4.

In S340, the method 300 may include determining second images to which the sample-based VQA should be applied. As described above, the second images may be determined such that the sample-based VQA is selectively applied to an image in a group. Here, the second images may overlap with some of the first images among a plurality of images in a video. For example, referring back to FIG. 2, the first images may be images A, A', B, B', C and C', and the second images may be images A and A'. Both of the parametric-based VQA and the sample-based VQA are applied to images A and A' which are included in the first images and the second images. Also, the second images may be determined according to time, sequence of frames, resolution of images and region of interest as described above with reference to FIG. 2.

In S350, the method 300 may include determining a second score based on applying the sample-based VQA to each of the second images. This operation will be described in more detail below with reference to FIG. 4.

In S360, the method 300 may include outputting a final score for at least one image based on the determined first score and the second score. This operation will be described in more detail below with reference to FIG. 4.

Figure 4:
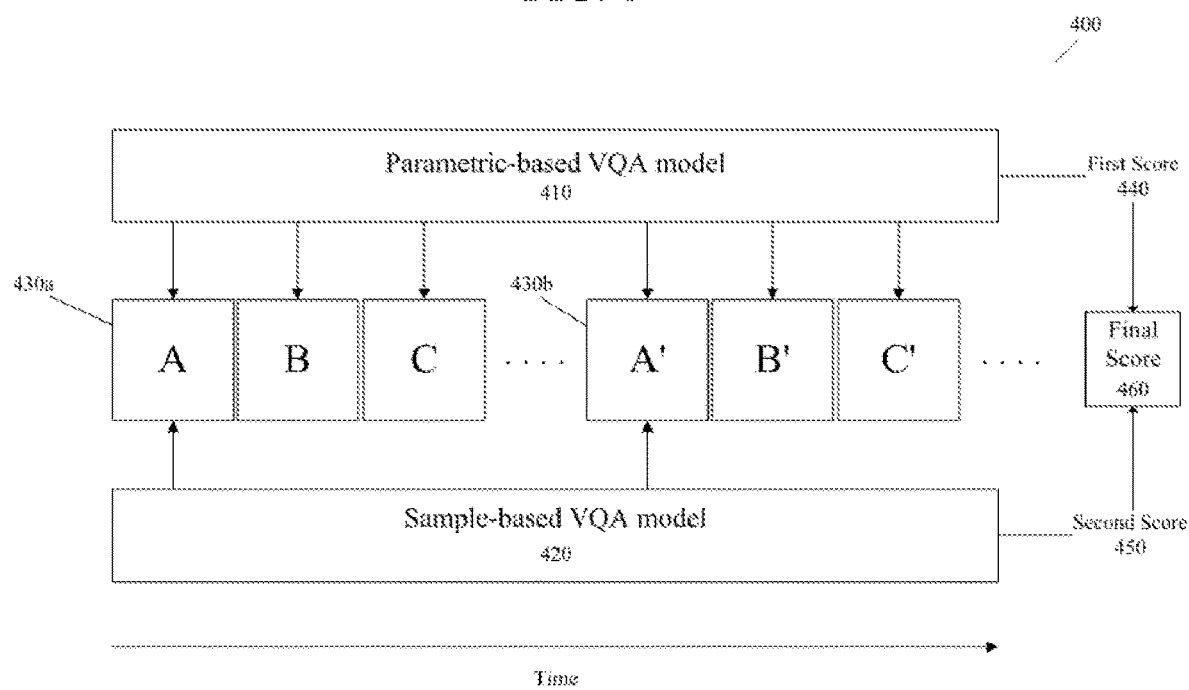
FIG. 4 is a diagram illustrating a method of performing a video quality assessment including calibrating scores according to an embodiment.

FIG. 4 is a diagram illustrating a method of performing a video quality assessment including calibrating scores according to an embodiment. Some of the features or operations of the method of performing the video quality assessment are described above with reference to FIGS. 2 and 3. Therefore, some of the repeated descriptions thereof may be omitted.

Referring to FIG. 4, a VQA algorithm 400 may include a parametric-based VQA model 410 and a sample-based VQA model 420. Here, both of the parametric-based VQA model 410 and the sample-based VQA model 420 may be used to evaluate quality of one or more images. Specifically, the parametric-based VQA model 410 is applied to each of the images A, B and C in the first group 430a and each of the images A', B' and C' in the second group 430b. The sample-based VQA model 420 is applied to a first image A in the first group 430a and a first image A' in the second group 430b.

The parametric-based VQA model 410 may output a first score 440 based on performing the parametric-based VQA on the images A, A', B, B', C and C'. The sampled-based VQA model 420 may output a second score 450 based on performing the sample-based VQA on the images A and A'. It should be understood that the first score 440 may include more than one score for a set of images, and the second score 450 may include more than one score for another set of images.

According to an embodiment, when the second score 450 is output from the sample-based VQA model 420, it may be used to calibrate the first score derived from the parametric-based VQA model 410. More specifically, a function of the sample-based VQA may add the second score 450 to the first score 440 derived from the parametric-based VQA model 410 to generate a final score 460. However, when the second score 450 is not available for at least one image among a plurality of images in a video, a sample-based VQA generated score for a previous image in the video may be used. For example, when the second score 450 is not available for the image C in the first group 430a, a sample-based VQA score for the image B in the first group 430a may be used as the second score 450. Also, when the second score 450 is not available for at least one image among a plurality of images in a video sequence, a function may be applied to N sampled-based VQA scores for some previous images in the video sequence. A function may include an average of the N sample-based VQA scores, a median of the N sample-based VQA scores, a minimum and maximum of the N sample-based VQA scores, etc., where N is a positive integer. For example, when the second score 450 is not available for the image C in the first group 430, an average of the two sample-based VQA scores for the image A and the image B in the first group 430 may be used.

The final score 460 may be determined based on two components, a base score and a delta score. The base score may be totally or partially based on the sample-based VQA when the sample-based VQA score is available. In other words, the base score is dependent on the second score 450 output by the sample-based VQA model 420. The delta score is based on the parametric-based VQA. That is, the delta score may be the first score 440 output by the parametric-based VQA model 410.

As an example, assume that the first score 440 for the image A derived from the parametric-based VQA model 410 is denoted as Sp (A), and the second score 450 for the image A derived from the sample-based VQA model 420 is denoted as Ss (A). Given that the parametric-based VQA model 410 and the sample-based VQA model 420 produce scores using the same scoring system, the final score for the image A may be Ss (A). That is, when the parametric-based VQA model 410 and the sample-based VQA model 420 use the same range of scoring scale (e.g., scores ranging from 1 to 10), the final score 460 may be the second score 450 output from the sample-based VQA model. In other words, when the second score 450 based on the sample-based model 420 is determined for an image, the second score 450 may take priority over the first score 440 given that the range of score is the same for both models, and use the second score 450 as the final score 460. However, the one or more embodiments, are not limited thereto, and the final score 460 may be derived according to various calculation methods.

Furthermore, the image B subsequent to the image A in the video sequence may be evaluated without using the sample-based VQA model 420. For example, the first score 440 for the image B derived from the parametric-based VQA model 410 may be denoted as Sp (B). When the scoring systems of the parametric-based VQA model 410 and the sample-based VQA model 420 are different from each other, the final score 460 of the image B may be calculated according to the following equation:

$$\text{Final Score (Image } B) = Sp(B) + w^*(Ss(A) - Sp(A)) + \text{Offset} \qquad \text{Eq. (1)}$$

Here, "w" is a weight that may be fixed or obtained from decoding information, such as an image type and quantization information. The weight w may be a value less than or equal to 1, for example, 0.8. The offset is a constant value for balancing the score systems of the two models. A value of the offset may be 0 or a non-zero value.

According to Equation (1), with the absence of a score for the image B from the sample-based VQA model 420, the VQA algorithm 400 may calculate the final score 460. Specifically, the difference between the scoring systems of the two models are calculated based on the image A, that is, Ss (A)−Sp (A), and the difference is then used to estimate a difference between the scoring systems at the image B, where only the first score 440 of the image B from the parametric VQA model 410 is available. Accordingly, when calculating for a final score by the VQA algorithm 400 without a score from the sample-based VQA model, the difference in the scoring systems between the parametric-based VQA model and the sample-based VQA model may be calibrated to provide more accurate assessment of the quality of a video while reducing the computation load.

As another example, the final score 460 of the image B may be derived according to the following equation:

$$\text{Final Score (Image } B) = w_0^*Ss(A) + w_1^*Sp(B) - w_2^*Sp(A) + \text{Offset} \qquad \text{Eq. (2).}$$

Here, $w_0$, $w_1$ and $w_2$ are weights that may be fixed or obtained from decoding information, such as an image type and quantization information. The offset may be a constant value that balances the difference between the scoring systems of the two models. A value of the offset may be 0 or a non-zero value.

Figure 5:
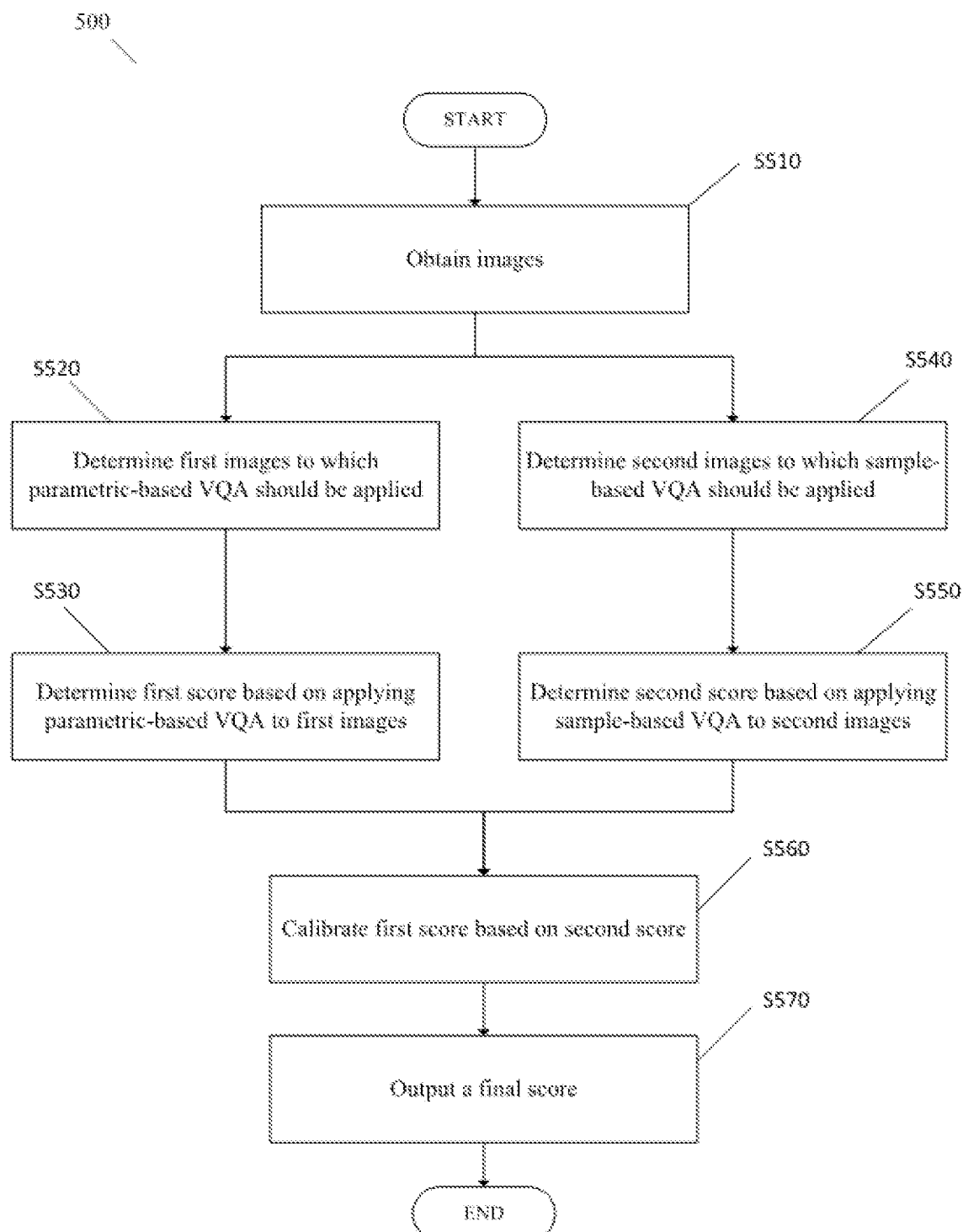
FIG. 5 is a flowchart illustrating operations of a video quality assessment including calibrating scores according to an embodiment.

FIG. 5 is a flowchart illustrating operations of a video quality assessment including calibrating scores according to an embodiment. Some of the features or operations of the method of performing the video quality assessment are described above with reference to FIGS. 2 and 3. The operations of S510 to S550 and S570 of FIG. 5 may correspond to the operations of S310 to S350 and S360 of FIG. 3, respectively. Therefore, some of the repeated descriptions thereof may be omitted.

Referring to FIG. 5, in S560, the method 500 may include calibrating a first score from the parameter-based VQA model based on a second score from the sample-based VQA model. Because the sample-based VQA involves pixel-by-pixel analysis of an image, it requires more intensive computation. Accordingly, as described above with reference to FIG. 4, the sample-based VQA model is only applied to some of a plurality of images of a video, while the parametric-based VQA model is applied to each of the plurality of images of the video. However, when there is a difference between the scoring systems of the sample-based VQA model and the parametric-based VQA model, there may be a discrepancy between the first score obtained from the parametric-based VQA model and the second score obtained from the sample-based VQA model, thereby degrading the accuracy of the video quality assessment.

As such, when the second score for an image is not available from the sample-based VQA model, the first score from the parametric-based VQA model may be calibrated based on the difference in the scoring systems calculated from a previous image frame for which both the first score from the parametric-based VQA model and the second score from the sample-based VQA model are available. In other words, referring back to FIG. 4, when there is no score from the sample-based VQA model 420 for the image B, the difference in the scoring systems may be determined from the image A for which the first score 440 from the parametric-based VQA model 410 and the second score 450 from the sample-based VQA model 420 are available. Based on determining the difference between the scoring systems of the two models, the first score 440 of the image B from the parametric-based VQA model 410 can be calibrated to obtain the final score 460.

Figure 6:
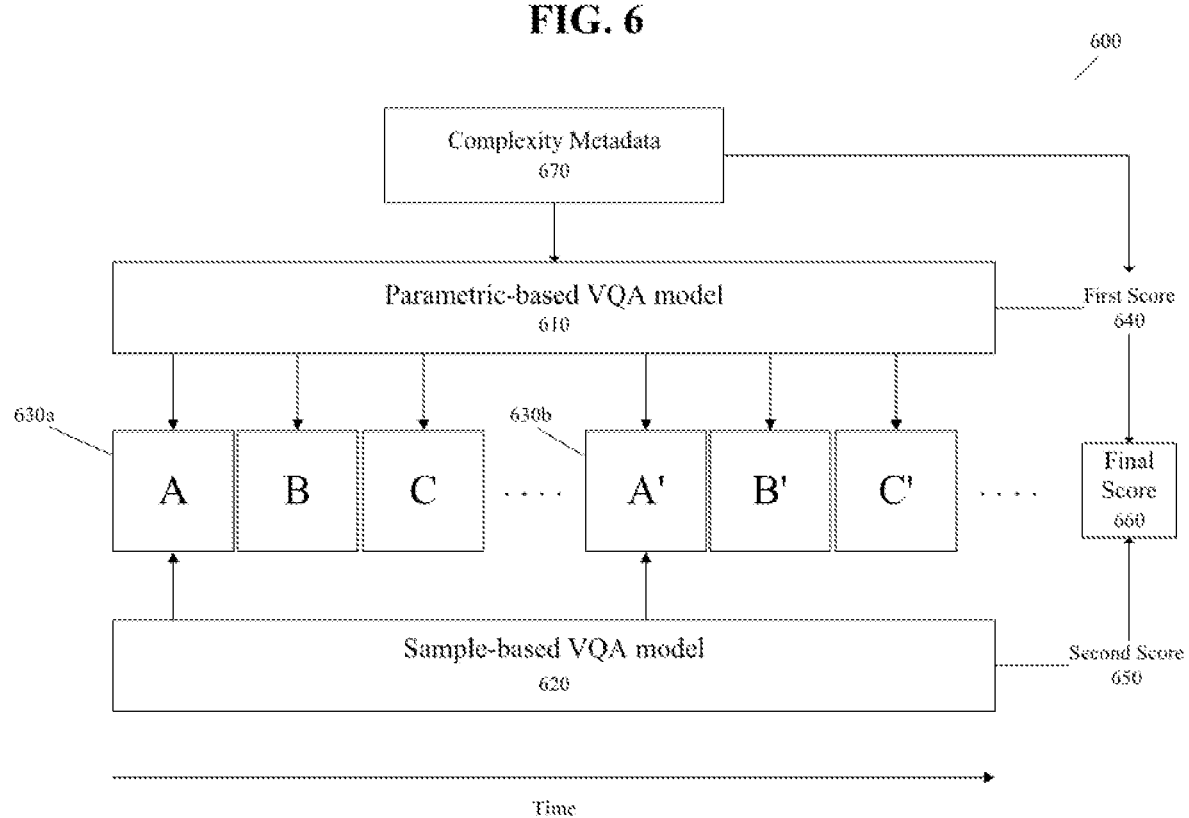
FIG. 6 is a diagram illustrating a method of performing a video quality assessment based on complexity of a video according to an embodiment.

FIG. 6 is a diagram illustrating a method of performing a video quality assessment based on complexity of a video according to an embodiment. Some of the features or operations of the method of performing the video quality assessment are described above with reference to FIGS. 4 and 5. Therefore, some of the repeated descriptions thereof may be omitted.

Referring to FIG. 6, the VQA algorithm 600 may include a parametric-based VQA model 610 that outputs a first score 640 and a sample-based VQA model 620 that outputs a second score 650, based on evaluating a plurality of images 630.

The VQA algorithm 600 may further include complexity metadata 670 that is received by the parametric-based VQA model 610 according to an embodiment. The complexity metadata 670 may include information about the complexity of a video, such as spatial textual complexity, temporal motion complexity, etc. The complexity of the video may be assessed by an encoder and included in a video bitstream transmitted from the encoder to a decoder. The metadata 670 may not be required by a decoder to perform decoding. However, the one or more embodiments are not limited thereto, and the complexity metadata may be transmitted to the decoder separately from the video bitstream via a network. Also, instead of the metadata, information about the complexity of the video may be delivered via shutter interval information (SEI) message to which decoding does not need to be performed by a decoder.

Based on receiving the complexity metadata including information about the complexity of a video, the parametric-based VQA model 610 may adjust the first score 640 based the information about the complexity of the video. For example, the first score 640 output from the parametric-based VQA model 610 may be adjusted to be lower if the complexity of the video is higher. Alternatively, the first score 640 output from the parametric-based VQA model 610 may be adjusted to be higher if the complexity of the video is lower.

Figure 7:
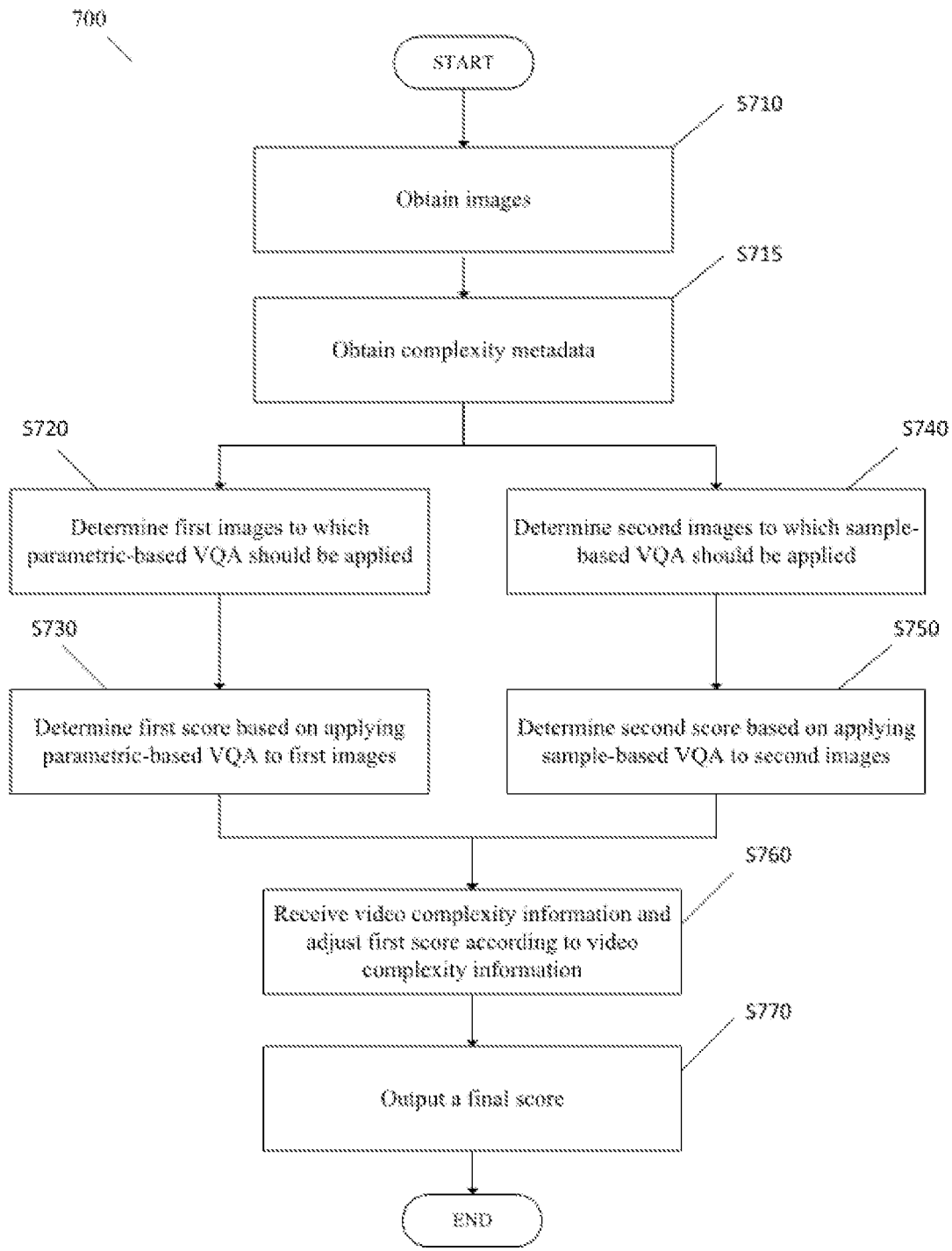
FIG. 7 is a flowchart illustrating operations of a video quality assessment based on complexity of a video according to an embodiment.

FIG. 7 is a flowchart illustrating operations of a video quality assessment based on complexity of a video according to an embodiment. Some of the features or operations of the method of performing the video quality assessment are described above with reference to FIGS. 4 and 5. The operations of S710 to S750 and S770 of FIG. 7 may correspond to the operations of S510 to S550 and S570 of FIG. 5, respectively. Therefore, repeated descriptions thereof may be omitted.

Referring to FIG. 7, in S760, the method 700 may further include adjusting a first score according to information about complexity of a video. The information about video complexity may include information such as spatial textual complexity, temporal motion complexity, etc. The complexity of the video may be assessed by an encoder and included in a video bitstream transmitted from the encoder to a decoder. Also, instead of the metadata, information about the complexity of the video may be delivered via SEI message to which decoding does not need to be performed by the decoder.

Based on receiving the complexity information of the video, the first score of the parametric-based VQA model may be adjusted based the information about the complexity of the video. For example, referring back to FIG. 6, the first score 640 output from the parametric-based VQA model 610 may be adjusted to be lower if the complexity of the video is higher. Alternatively, the first score 640 output from the parametric-based VQA model 610 may be adjusted to be higher if the complexity of the video is lower. Here, the first score may be adjusted based on a predetermined threshold. For example, if a temporal motion complexity of the video is higher than a predetermined threshold, then the first score may be adjusted to be lower.

Figure 8:
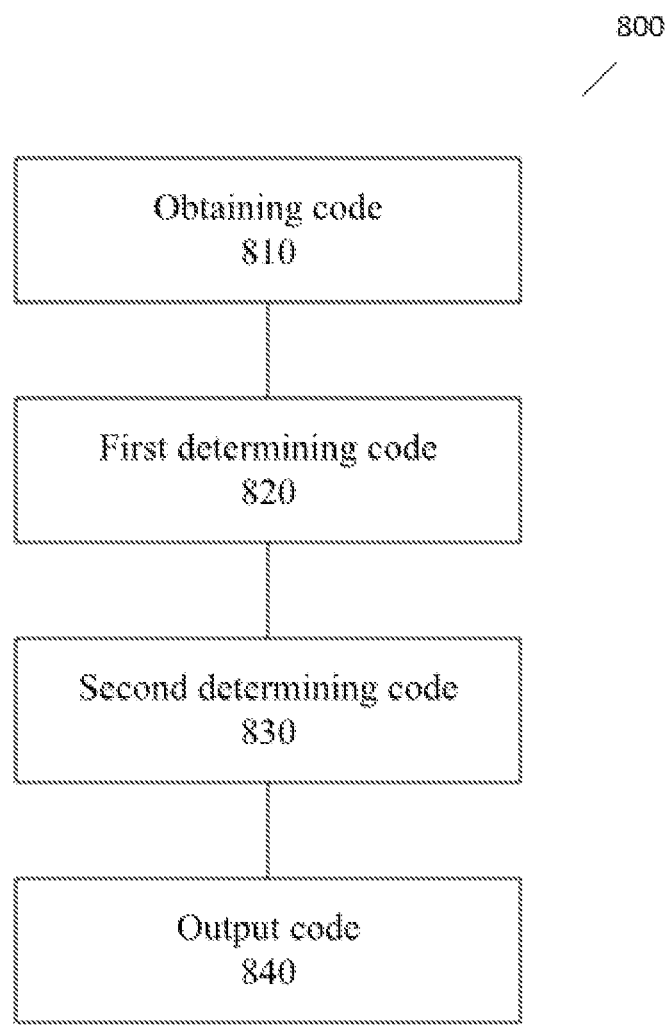
FIG. 8 is a block diagram illustrating computer program code for performing the method of FIG. 3, according to an embodiment.

FIG. 8 is a block diagram illustrating computer program code for performing the method of FIG. 3, according to an embodiment. The computer program code of FIG. 8 may be stored in a memory, and may be accessed by at least one processor to execute the stored computer program code. Some of the features or operations of the method of performing the video quality assessment are described above with reference to FIGS. 2 and 3. Therefore, repeated descriptions thereof may be omitted.

A computer program code 800 may include obtaining code 810, first determining code 820, second determining code 830 and output code 840.

The obtaining code 810 may be configured to obtain images of a video to be analyzed.

The first determining code 820 may be configured to determine first images to which a parametric-based VQA should be applied. The first images may be all of a plurality of images in a video. For example, the first images may be images A, A', B, B', C and C' in FIG. 2. However, the one or more embodiments are not limited thereto, and the parametric-based VQA may be selectively applied to some of the plurality of images. The first determining code 820 may be configured to determine a first score based on applying the parametric-based VQA to the first images.

The second determining code 830 may be configured to determine second images to which a parametric-based VQA should be applied. The second images may be determined such that the sample-based VQA is selectively applied to one or more of the plurality of images. For example, the second images may be images A and A' in each of the first group 230*a* and the second group 230*b* in FIG. 2. The second determining code 830 may be configured to determine a second score based on applying the sample-based VQA to the second images.

The output code 840 may be configured to output a final score based on the determined first score and the determined second score.

Figure 9:
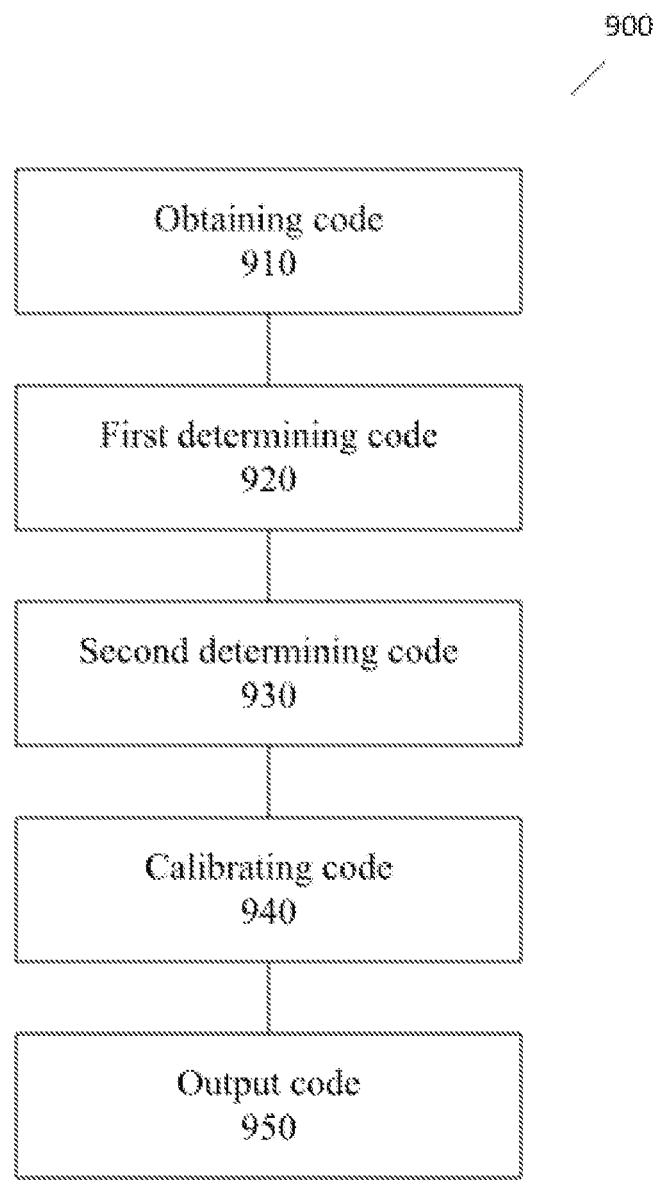
FIG. 9 is a block diagram illustrating computer program code for performing the method of FIG. 5, according to an embodiment.

FIG. 9 is a block diagram illustrating computer program code for performing the method of FIG. 5, according to an embodiment. The computer program code of FIG. 9 may be stored in a memory, and may be accessed by at least one processor to execute the stored computer program code. Some of the features or operations of the method of performing the video quality assessment are described above with reference to FIGS. 4 and 5. Therefore, repeated descriptions thereof may be omitted.

A computer program code 900 may include obtaining code 910, first determining code 920, second determining code 930, calibrating code 940 and output code 950.

The obtaining code 910 may be configured to obtain images of a video to be analyzed.

The first determining code 920 may be configured to determine first images to which a parametric-based VQA should be applied. The first images may be all of a plurality of images in a video. For example, the first images may be images A, A', B, B', C and C' in FIG. 2. However, the one or more embodiments are not limited thereto, and the parametric-based VQA may be selectively applied to some of the plurality of images. The first determining code 920 may be configured to determine a first score based on applying the parametric-based VQA to the first images.

The second determining code 930 may be configured to determine second images to which a parametric-based VQA should be applied. The second images may be determined such that the sample-based VQA is selectively applied to one or more of the plurality of images. For example, the second images may be images A and A' in each of the first group 230*a* and the second group 230*b* in FIG. 2. The second determining code 930 may be configured to determine a second score based on applying the sample-based VQA to the second images.

The calibrating code 940 may be configured to calibrate the first score from the parameter-based VQA model based on the second score from the sample-based VQA model.

The output code 950 may be configured to output a final score based on the determined first score and the determined second score.

Figure 10:
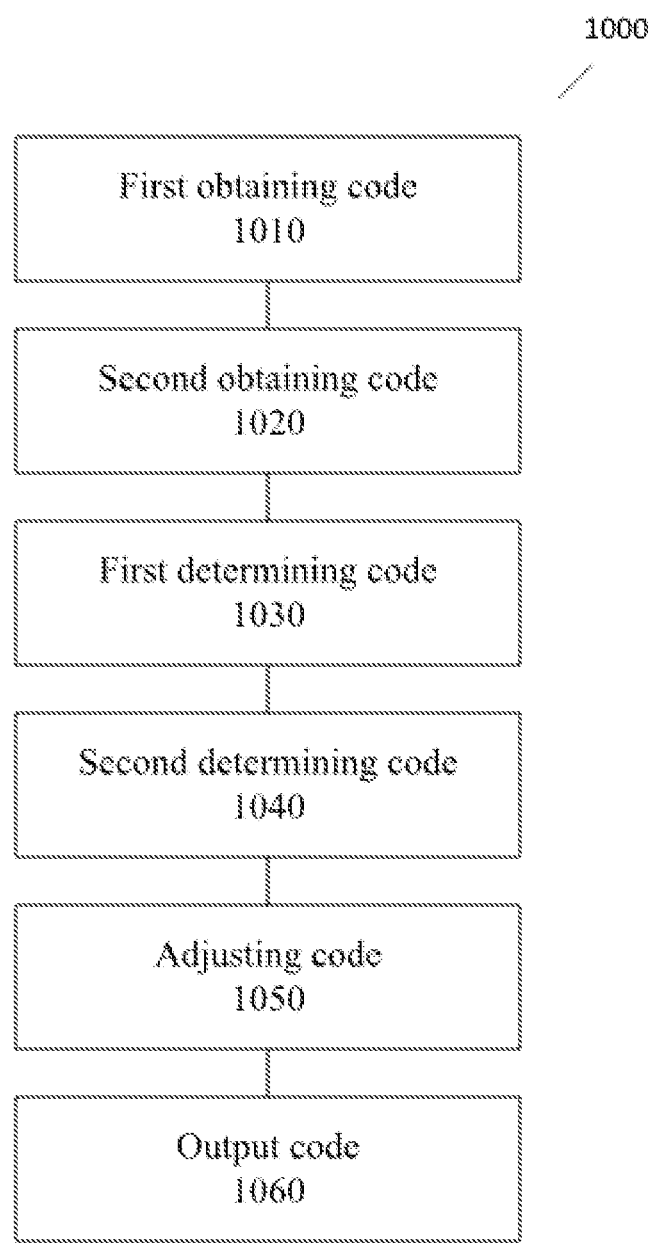
FIG. 10 is a block diagram illustrating computer program code for performing the method of FIG. 7, according to an embodiment.

FIG. 10 is a block diagram illustrating computer program code for performing the method of FIG. 7, according to an embodiment. The computer program code of FIG. 10 may be stored in a memory, and may be accessed by at least one processor to execute the stored computer program code. Some of the features or operations of the method of performing the video quality assessment are described above with reference to FIGS. 6-7. Therefore, repeated descriptions thereof may be omitted.

A computer program code 1000 may include first obtaining code 1010, second obtaining code 1020, first determining code 1030, second determining code 1040, adjusting code 1050 and output code 1060.

The first obtaining code 1010 may be configured to obtain images of a video to be analyzed.

The second obtaining code 1020 may be configured to obtain information about complexity of the video to be analyzed. The information about video complexity may include information such as spatial textual complexity, temporal motion complexity, etc. The complexity of the video may be assessed by an encoder and included in a video bitstream transmitted from the encoder to a decoder. Also, the information about the complexity of the video may be delivered via metadata or SEI message, to which decoding does not need to be performed by the decoder.

The first determining code 1030 may be configured to determine first images to which a parametric-based VQA should be applied. The first images may be all of a plurality of images in a video. For example, the first images may be images A, A', B, B', C and C' in FIG. 2. However, the one or more embodiments are not limited thereto, and the parametric-based VQA may be selectively applied to some of the plurality of images. The first determining code 1030 may be configured to determine a first score based on applying the parametric-based VQA to the first images.

The second determining code 1040 may be configured to determine second images to which a parametric-based VQA should be applied. The second images may be determined such that the sample-based VQA is selectively applied to one or more of the plurality of images. For example, the second images may be images A and A' in each of the first group 230*a* and the second group 230*b* in FIG. 2. The second determining code 1040 may be configured to determine a second score based on applying the sample-based VQA to the second images.

The adjusting code 1050 may be configured to adjust the first score according to the information about the complexity of the video.

The output code 1060 may be configured to output a final score based on the determined first score and the determined second score.

Some of the embodiments of the disclosure have been shown and described above. However, the one or more embodiments of the disclosure are not limited to the aforementioned specific embodiments. It may be understood that various modifications, substitutions, improvements and equivalents thereof can be made without departing from the spirt and scope of the disclosure. It should be understood that such modifications, substitutions, improvements and equivalents thereof shall fall within the protection scope of the disclosure, and should not to be construed independent from the inventive concept or prospect of the disclosure.

What is claimed is:

1. A method of performing a video quality assessment (VQA), the method comprising:
   receiving a bitstream comprising a plurality of images of a video, the plurality of images being divided into one or more groups;
   identifying, from the bitstream, first images among the plurality of images to which a parametric-based VQA is to be applied;
   determining bitstream level information based on applying the parametric-based VQA to each of the first images, the bitstream level information indicating any of a bitrate, a quantization parameter, and a frame rate;
   identifying, from the bitstream, second images among the plurality of images to which a sample-based VQA is to be applied;

determining pixel level information based on applying the sample-based VQA to each of the second images;

assessing the video based on a combination of the bitstream level information and the pixel level information, the bitstream level information being selectively calibrated depending on the pixel level information; and based on determining that the pixel level information is not available for at least one of the first images, calibrating the first score, wherein the calibrating the first score comprises:

obtaining one or more first images prior to the at least one of the first images in a sequence in decoding order;

obtaining one or more second images corresponding to the one or more first images;

calculating a difference between a first scoring system of the parametric-based VQA and a second scoring system of the sample-based VQA based on the bitstream level information of the one or more first images and the pixel level information of the one or more second images; and calibrating the bitstream level information based on the difference between the first scoring system and the second scoring system.

2. The method of claim 1, wherein the identifying the second images comprises: selecting at least one image in each of the one or more groups.

3. The method of claim 1, wherein the identifying the second images comprises: selecting images among the plurality of images at a predetermined time interval or a predetermined frame interval.

4. The method of claim 1, further comprising:
receiving information about complexity of the video; and
adjusting the bitstream level information based on the information about complexity of the video.

5. The method of claim 4, wherein the information about complexity of the video comprises at least one from among a spatial textual information of the video, a temporal motion information of the video and a resolution of the video.

6. The method of claim 4, wherein the information about complexity of the video is included in at least one from among metadata and shutter interval information (SEI) message.

7. The method of claim 1, wherein at least one first image from among the first images and at least one second image from among the second images are the same.

8. An apparatus for performing a video quality assessment (VQA) comprising:

at least one memory storing computer program code; and
at least one processor configured to access the at least one memory and operate as instructed by the computer program code, the computer program code comprising:

receiving code configured to cause the at least one processor to receive a bitstream comprising a plurality of images of a video, the plurality of images being divided into one or more groups;

first determining code configured to cause the at least one processor to determine, from the bitstream, first images among the plurality of images to which a parametric-based VQA is to be applied, and to determine bitstream level information based on applying the parametric-based VQA to each of the first images, the bitstream level information indicating any of a bitrate, a quantization parameter, and a frame rate;

second determining code configured to cause the at least one processor to determine, from the bitstream, second images among the plurality of images to which a sample-based VQA is to be applied, and determine pixel level information based on applying the sample-based VQA to each of the second images;

assessing code configured to cause the at least one processor to assess the video based on a combination of the bitstream level information and the pixel level information, the bitstream level information being selectively calibrated depending on the pixel level information; and calibrating code configured to cause the at least one processor to, based on determining that the pixel level information is not available for at least one of the first images, calibrate the first score, wherein the calibrating the first score comprises:

obtaining one or more first images prior to the at least one of the first images in a sequence in decoding order;

obtaining one or more second images corresponding to the one or more first images;

calculating a difference between a first scoring system of the parametric-based VQA and a second scoring system of the sample-based VQA based on the bitstream level information of the one or more first images and the pixel level information of the one or more second images; and calibrating the bitstream level information based on the difference between the first scoring system and the second scoring system.

9. The apparatus of claim 8, wherein the second determining code is further configured to cause the at least one processor to select at least one image in each of the one or more groups.

10. The apparatus of claim 8, wherein the second determining code is further configured to cause the at least one processor to select images among the plurality of images at a predetermined time interval or a predetermined frame interval.

11. The apparatus of claim 8, further comprising:
adjusting code configured to cause the at least one processor to:
receive information about complexity of the video; and
adjust the bitstream level information based on the information about complexity of the video.

12. The apparatus of claim 11, wherein the information about complexity of the video comprises at least one from among a spatial textual information of the video, a temporal motion information of the video and a resolution of the video.

13. The apparatus of claim 11, wherein the information about complexity of the video is included in at least one from among metadata and shutter interval information (SEI) message.

14. A non-transitory computer-readable storage medium storing computer program code, the computer program code, when executed by at least one processor, the at least one processor is configured to:

receive a bitstream comprising a plurality of images of a video, the plurality of images being divided into one or more groups;

identifying, from the bitstream, first images among the plurality of images to which a parametric-based VQA is to be applied, and determine bitstream level information based on applying the parametric-based VQA to each of the first images, the bitstream level information indicating any of a bitrate, a quantization parameter, and a frame rate;
identify, from the bitstream second images among the plurality of images to which a sample-based VQA is to be applied, and determine pixel level information based on applying the sample-based VQA to each of the second images;
assessing the video based on a combination of the bitstream level information and the pixel level information, the bitstream level information being selectively calibrated depending on the pixel level information; and
based on determining that the pixel level information is not available for at least one of the first images, calibrating the first score,
wherein the calibrating the first score comprises:
   obtaining one or more first images prior to the at least one of the first images in a sequence in decoding order;
   obtaining one or more second images corresponding to the one or more first images;
   calculating a difference between a first scoring system of the parametric-based VQA and a second scoring system of the sample-based VQA based on the bitstream level information of the one or more first images and the pixel level information of the one or more second images; and
   calibrating the bitstream level information based on the difference between the first scoring system and the second scoring system.

15. The non-transitory computer-readable storage medium of claim 14, wherein the at least one processor is further configured to:
   receive information about complexity of the video; and
   adjust the bitstream level information based on the information about complexity of the video.

\* \* \* \* \*